United States Patent [19]

Selvarajan et al.

[11] 4,422,944
[45] Dec. 27, 1983

[54] CATIONIC POLYMERS SUITABLE FOR REDUCING TURBIDITY IN LOW TURBIDITY WATERS

[75] Inventors: Radhakrishnan Selvarajan, Oak Park; Edward G. Ballweber, Glenwood; Manuel Slovinsky, Woodridge, all of Ill.

[73] Assignee: Nalco Chemical Company, Oak Brook, Ill.

[21] Appl. No.: 436,537

[22] Filed: Oct. 25, 1982

Related U.S. Application Data

[63] Continuation-in-part of Ser. No. 253,405, Apr. 13, 1981, abandoned, which is a continuation-in-part of Ser. No. 138,045, Apr. 7, 1980, abandoned.

[51] Int. Cl.$^3$ ............................................. C02F 1/56
[52] U.S. Cl. ..................................... 210/736; 210/735
[58] Field of Search ................ 209/5; 210/702, 705, 210/727, 728, 735, 736, 738; 528/247, 250, 269

[56] References Cited

U.S. PATENT DOCUMENTS

| Re. 17,511 | 12/1929 | North | 528/269 |
|---|---|---|---|
| Re. 27,275 | 1/1972 | Dajani | 210/736 |
| 1,659,152 | 2/1928 | North | 528/250 |
| 2,101,215 | 12/1937 | Graves et al. | 528/269 |
| 2,151,883 | 3/1939 | Adams | 528/269 |
| 2,511,913 | 6/1950 | Greenlee | 528/250 |
| 3,065,206 | 11/1962 | Chamot | 528/269 |
| 3,071,559 | 1/1963 | Smith | 525/512 |
| 3,290,310 | 12/1966 | Morf et al. | 210/735 |
| 3,372,129 | 3/1968 | Phillips | 210/736 |
| 3,539,659 | 11/1970 | De Hoff | 528/250 |
| 3,594,272 | 7/1971 | Shen et al. | 528/232 |
| 3,773,721 | 11/1973 | Tiedeman | 525/495 |
| 4,025,429 | 5/1977 | Neuschutz | 210/735 |
| 4,155,847 | 5/1979 | Tanaka et al. | 210/729 |
| 4,308,149 | 12/1981 | Selvarajan | 210/736 |

FOREIGN PATENT DOCUMENTS

| 49-3886 | 1/1974 | Japan | 210/736 |
|---|---|---|---|
| 137836 | 8/1960 | U.S.S.R. | 528/269 |

Primary Examiner—Peter A. Hruskoci
Attorney, Agent, or Firm—John G. Premo; Robert A. Miller; Donald G. Epple

[57] ABSTRACT

Water-soluble aniline-formaldehyde-polyamine polymers provide excellent flocculants for low turbidity waters.

7 Claims, No Drawings

CATIONIC POLYMERS SUITABLE FOR REDUCING TURBIDITY IN LOW TURBIDITY WATERS

INTRODUCTION

This application is a continuation-in-part of our earlier filed copending application, Ser. No. 253,405, filed Apr. 13, 1981, now abandoned, which in turn was a continuation-in-part of our earlier filed copending application, Ser. No. 138,045, filed Apr. 7, 1980, now abandoned.

Low turbidity waters are often found in nature in the form of waters derived from streams, lakes, and rivers. These waters are slightly turbid to the eye and usually contain less than a 1,000 ppm of suspended solids. In many cases the suspended solids in these waters are inorganic.

Low turbidity waters of the types described above are difficult to treat and oftentimes require special treating agents to remove the turbidity by means of flocculation.

The present invention provides improved flocculating agents for treating low turbidity waters.

THE INVENTION

In accordance with the invention, it has been found that improved flocculating agents for low turbidity waters are afforded by using water-soluble polymers of aniline or a substituted aniline reacted with formaldehyde and certain polyamines. These polymers work at low dosages to remove suspended solids from low turbidity waters. These polymers are characterized as being in the form of aqueous solutions and are of relatively low molecular weight, e.g. less than 5,000 and usually less than 1,000.

Aniline

The invention contemplates using as one of the starting materials aniline. In addition to aniline, alkyl-substituted anilines, such as methyl, ethyl and propyl aniline may be employed. The main criteria for the alkyl-substituted aniline is that it be water-soluble.

Formaldehyde

Formaldehyde may be used as a gas, although it is preferably employed as formalin, e.g. a 37% aqueous solution of formaldehyde.

The Polyamines

The polyamines used in the practice of the invention may be either ethylene polyamines, polyalkylene polyamines and cycloaliphatic polyamines. The preferred amines are the polyethylene polyamines.

The ethylene polyamines and the polyethylene polyamines include such well-known materials as ethylene diamine, diethylene triamine, triethylene tetramine and tetraethylene pentamine (TEPA).

The ethylene polyamines of the type described above are prepared by the well-known reaction of ethylene dichloride with ammonia. This produces a mixture of ethylene polyamines which are fractionally distilled. It is also known that ethylene dichloride ammonia reactions can produce polymeric polyethylene polyamines. See for example U.S. Pat. No. 3,372,129, the disclosure of which is incorporated herein by reference.

Another alkylene polyamine that can be used is hexamethylene diamine.

A typical cyclic aliphatic polyamine that may be used is the compound 1,2-diaaminocyclohexane (DACH).

The Reaction Conditions

As indicated, the polymers are prepared by reacting the above ingredients in the form of an aqueous solution. The polymer concentration in the solution will vary between about 10–35% by weight.

The reaction temperature may be varied, although typical temperatures may vary between about 80°–110° C. The reaction time will vary depending upon the temperature of the reaction ingredients used and the degree of polymerization sought to be obtained.

The molar ratio of aniline or substituted-aniline to polymer to formaldehyde will preferably be about 1:1:2. At least 2 moles of formaldehyde must be used. Best results use about 2.5–3.5 moles in the synthesis of the polymer. Preferred polymers include the following:

(a) ethylene dichloride-ammonia polymer/aniline/formaldehyde (2:1.6:1.6);
(b) ethylene dichloride-ammonia polymer/aniline/formaldehyde (1:2:2);
(c) ethylene dichloride-ammonia polymer/aniline/formaldehyde (2:1:1); and
(d) DACH/aniline/formaldehyde (1:1:2); DACH/aniline/formaldehyde (2.5:1:2.5).

A particularly preferred polymer is aniline/tetraethylene pentamine (TEPA)/formaldehyde, where BABA may be substituted for aniline.

The polymers are effective when used on an active polymer basis to treat low turbidity waters, the dosage ranges between 5–150 ppm. 10–50 ppm represents a typically preferred dosage.

To illustrate the invention with respect to the preparation of the polymers, Examples 1 through 4 are presented.

EXAMPLE 1

| EDC[1]-Ammonia Polymer/Aniline/Formaldehyde | | | |
|---|---|---|---|
| Reactants | g | Moles | Wt. % |
| EDC-ammonia, 39% polymer | 21.6 | 0.2 | 8.5 |
| Aniline | 37.2 | 0.4 | 14.7 |
| Water | 101.2 | | 40.0 |
| Hydrochloric acid (36%) | 60.6 | 0.6 | 23.9 |
| Formaldehyde (37%) | 32.4 | 0.4 | 12.8 |
| | 253.0 | | 99.9 |

[1]Ethylene dichloride

Polymerization Steps (1) A 500-ml resin flask fitted with a stirrer, condenser and addition funnel was charged with EDC-ammonia (39% polymer), aniline and water.

(2) Hydrochloric acid was added with stirring. A mild exotherm raised the temperature to 35° C.

(3) Formaldehyde was then added dropwise through 10 min. Fine yellow particles were seen suspended.

(4) Upon heating the mixture to reflux temperature, 100° C., a clear reddish-brown solution was obtained. The refluxing was continued for 2 hours.

(5) The dark brown solution was cooled and collected.

Product Characteristics

Polymer solids=20%
pH=0.1
Color=Dark brown

EXAMPLE 2

| Aniline/1,2-Diaminocyclohexane/Formaldehyde | | | |
|---|---|---|---|
| Reactants | g | Moles | Wt. % |
| 1,2 diaminocyclohexane (DuPont) | 58.0 | 0.5 | 14.04 |
| Water | 179.9 | | 43.58 |
| Hydrochloric acid (36%) | 116.0 | 1.14 | 28.08 |
| Formaldehyde (37%) | 40.5 | 0.5 | 9.8 |
| Aniline | 18.6 | 0.2 | 4.5 |
| | 413.0 | | 100.0 |

Polymerization Steps (1) A one-liter resin flask fitted with stirrer, condenser and addition funnel was charged with diaminocyclohexane and water.

(2) Hydrochloric acid, 101 g. was added to the amine with stirring. The exotherm raised the temperature from 25° C. to 55° C. Copious white fuming was also noticed. The solution pH was 0.7.

(3) To the hot amine hydrochloride formaldehyde was added through 5 minutes. A mild exotherm due to the methylolation raised further the temperature to 60° C.

(4) The solution was then heated to 70° C. and held for one hour.

(5) To the hot brown solution, the rest of the hydrochloric acid, 15 g. was added followed by the dropwise, 15 minutes, addition of aniline. The precipitation and rapid disolution of a yellow solid was noticed.

(6) The reaction mixture was then heated to reflux, 98° C., and held for 3 hours.

(7) Upon cooling, the product (a clear brown solution) was obtained.

Product Characteristics

Polymer solids=20%
pH=0.1
Color=Dark brown

EXAMPLE 3

Aniline/Hexamethylenediamine/Formaldehyde

A condensation terpolymer of aniline, hexamethylenediamine and formaldehyde showed excellent activity in the clarification of the activated sludge.

| Reactants | g | Moles | Wt. % |
|---|---|---|---|
| Aniline | 10.93 | 0.1175 | 10.11 |
| Hexamethylenediamine (70%) | 9.76 | 0.0589 | 9.03 |
| Water | 52.97 | | 49.0 |
| Hydrochloric Acid (36%) | 22.92 | 0.226 | 21.2 |
| Formaldehyde (37%) | 11.52 | 0.142 | 10.66 |
| | 108.1 | | 100.00 |

Polymerization Steps (1) A 500-ml resin flask fitted with stirrer, condenser, and addition funnel was charged with hydrochloric acid, 12 g., and water, 35.15 g.

(2) Hexamethylenediamine was then added with stirring. An exotherm accompanies the evolution of dense white fumes.

(3) To the warm amine salt solution, 50° C., formaldehyde, 9.52 g., was added rapidly and the mixture was kept stirred for 30 minutes at 70° C.

(4) The rest of the HCl, 10.92 g., was added, followed by the rapid addition of aniline.

(5) The solution was heated to 100° C. and a clear red solution was seen refluxing.

(6) After refluxing the mixture for 3 hours, water, 17.82 g., and formaldehyde, 2 g., were added. The reaction was continued further for 2 hours, cooled, and collected the product, a clear, brown, watery solution.

Product Characteristics

Polymer solids=18.00%
Color=Dark brown
pH=0.1

EXAMPLE 4

In the reaction below for the production of a terpolymer of aniline-tetraethylene pentamine (TEPA)-formaldehyde, 31.5% concentrated HCl was used in the run.

| Reactants | g. | Moles | Wt. % |
|---|---|---|---|
| Aniline | 46.5 | 0.5 | 12.03 |
| TEPA | 20.8 | 0.11 | 5.32 |
| Hydrochloric acid 20 Baume, 31.45% | 123.0 | 1.06 | 31.84 |
| Formaldehyde, 37% | 31.0 | 1.0 | 20.96 |
| D. I. Water | 115.0 | | 29.76 |
| | 386.3 | | 99.97 |

As polymerization steps, the following regimen was followed:

(1) A 500 ml resin flask fitted with a stirrer, condenser and addition funnel was charged with hydrochloric acid, 123 g. and deionized water, 115 g.

(2) TEPA, 20.8 g., was then added with stirring through 5 minutes. Dense white fumes and exotherm were noticed. The reaction temperature was 60° C.

(3) To the hot amine salt solution, formaldehyde, 81 g, was added over 10 minutes. The dark brown solution was kept heated at 80° C. for 0.5 hour.

(4) Then aniline, 46.5 g, was added in rapidly. The dark brown solution, pH 0.3, was kept refluxed (95°–96° C.) for 3 hours and collected the clear, nonviscous polymer product, 20.52% actives.

Product Characterstics

Polymer Solids=20.52%
Color=Dark brown
pH=0.3

To illustrate the efficiency of various polymers of the invention in treating low turbidity waters, Table I is set forth below.

TABLE I

SYNTHESIS AND ACTIVITY OF TERPOLYMERS OF ANILINE, FORMALDEHYDE AND AMINES

| Polymer Composition | | Reaction Conditions | | | | | Water Clarification | |
|---|---|---|---|---|---|---|---|---|
| Type | Mole Ratio | Reaction Mode | T°C. | hrs | pH | % Solids | Water Type and/or Source | r/r$_o$ Actives Basis |
| A-DACH F | 1:1:2 | A+DACH+HCl+F | 95 | 0.5 | 0.5 | 10.0 | | — |
| A-DACH F | 1:1:2 | A+DACH+HCl+F | 95 | 0.5 | 0.5 | 10.0 | | — |
| A-DACH F | 1:1:2.5 | A+DACH+HCl+F | 98 | 4.0 | 0.5 | 23.0 | 20 ppm Kaolin | poor |
| A-DACH F | 1:1:3 | A+DACH+HCl+F | 95 | 1.0 | 0.5 | 25.0 | | |
| A-DACH F | 1:1:3 | A+DACH+HCl+F | 95 | 1.0 | 0.5 | 10.56 | | — |
| A-DACH F | 1:1:3 | | 85 | 0.25 | 0.5 | 10.0 | | — |
| A-DACH F | 1:1.33:3 | | 95 | 0.5 | 0.5 | 17.73 | | — |
| A-DACH F | 1:1.33:3.6 | | 85 | 0.25 | 0.5 | 10.0 | | — |
| A-DACH F | 1:1.5:3 | | 85 | 1.0 | 0.5 | 17.75 | | — |
| A-DACH F | 1.2:1:2.5 | AF+DACHF+HCl | 95 | 5.0 | 0.5 | 17.91 | | — |
| A-DACH F | 1.25:1:2.6 | A+DACH+HCl+F | 95 | 1.0 | 0.5 | 20.0 | | — |
| A-DACH F | 2:1:3 | A+DACH+HCl+F | 98 | 2.5 | 0.5 | 5.0 | | |
| A-DACH F | 3:1:4 | A+DACH+HCl+F | 96 | 4.5 | 0.5 | 10.0 | 20 ppm Kaolin | 1.0 |
| A-DACH F | 4:1:5 | A+DACH+HCl+F | 98 | 3.0 | 0.5 | 20.0 | 20 ppm Kaolin | 6.0 |
| A-DACH F | 4:1:5 | A+DACH+HCl+F | 95 | 4.5 | 0.5 | 10.0 | 20 ppm Kaolin | 1.0 |
| A-DACH F | 1:2:5 | A+DACH+HCl+F | 95 | 0.5 | 0.5 | 10.0 | | — |
| A-DACH F | 1:1:1.27 | A+DACH+HCl+F | 98 | 3.5 | 0.2 | 12.0 | 20 ppm Kaolin | 1.4 |
| A-DACH F | 1:1:2 | A+DACH+HCl+F | 98 | 2.0 | 0.2 | 25.4 | | — |
| A-DACH F | 1:1:2 | DACH.F.HCl+A | 98 | 2.0 | 0.2 | 25.4 | | |
| A-DACH F | 1:1:2 | A+DACH+HCl+F | 98 | 1.0 | 0.2 | 15.0 | | — |
| A-DACH F | 1:1:2 | A.DACH.F+HCl | 98 | 1.0 | 0.2 | 20.15 | | — |
| A-DACH F | 1:1:2 | DACH.F.HCl+A | 98 | 4.0 | 0.2 | 20.0 | | — |
| A-DACH F | 1:1:2.28 | DACH.F.HCl+A | 98 | 3.0 | 0.2 | 16.89 | | — |
| A-DACH F | 1:1:2.5 | A.DACH.F+HCl | 100 | 3.0 | 0.2 | 25.0 | | — |
| A-DACH F | 1:1:2.5 | A+DACH+HCl+F | 100 | 0.5 | 0.2 | 25.0 | | — |
| A-DACH F | 1:1.19:2 | DACH.F.HCl+A | 100 | 3.5 | 0.4 | 19.65 | 20 ppm Kaolin | 1.7 |
| A-DACH F | 1:1.9:2.25 | DACH.F.HCl+A | 100 | 4.5 | 0.4 | 19.57 | 20 ppm Kaolin | 1.3 |
| A-DACH F | 1:1.19:2.5 | DACH.F.HCl+A+F | 100 | 4.0 | 0.4 | 10.0 | | — |
| A-DACH F | 1:1.25:2.38 | DACH.F.HCl+AF.HCl | 80 | 0.5 | 0.1 | 25.0 | | — |
| A-DACH F | 1:1.25:2.38 | DACH.F.HCl+AF.HCl | 80 | 0.5 | 0.1 | 16.66 | | — |
| A-DACH F | 1:1.3:2.3 | DACH.F.HCl+A | 96 | 2.5 | 0.1 | 15.0 | | — |
| A-DACH F | 1:1.3:2.6 | DACH.F.HCl+A | 96 | 2.5 | 0.1 | 15.0 | | — |
| A-DACH F | 1:2:2 | A+DACH+HCl+F | 96 | 1.0 | 0.1 | 20.0 | | — |
| A-DACH F | 1:2:2 | DACH.F.HCl+A | 96 | 3.0 | 0.1 | 19.8 | 20 ppm Kaolin | 1.9 |
| A:DACH:F | 1:2:2 | A.DACH.F+HCl | 100 | 3.0 | 0.1 | 10.0 | | — |
| A:DACH:F | 1:2:2.5 | DACH.F.HCl+A | 98 | 6.0 | 0.2 | 10.0 | 20 ppm Kaolin | 2.8 |
| A:DACH:F | 1:2:3 | AHCl.F+DACH | 102 | 3.0 | 0.2 | 25.0 | 20 ppm Kaolin | poor |
| A:DACH:F | 1:2:3 | AHCl.F+DACH | 102 | 4.0 | 0.2 | 20.0 | | — |
| A:DACH:F | 1:2:3 | A.DACH.HCl+F | 100 | 0.25 | 0.2 | 20.0 | | — |
| A:DACH:F | 1:2:3 | DACH.HCl.F+A | 96 | 2.5 | 0.2 | 14.84 | | — |
| A:DACH:F | 1:2:3 | DACH.HCl.F+A | 96 | 3.5 | 0.2 | 10.0 | | — |
| A:DACH:F | 1:2:4 | A.HCl.F+DACH | 102 | 6.0 | 0.2 | 24.53 | 20 ppm Kaolin | poor |
| A:DACH:F | 1:2.5:2.5 | DACH.HCl.F+A | 98 | 2.5 | 0.2 | 20.0 | 20 ppm Kaolin | 1 |
| A:DACH:F | 1:2.5:2.5 | DACH.HCl.F+A | 98 | 3.0 | 0.2 | 30.0 | 20 ppm Kaolin | 1 |
| A:DACH:F | 1:2.5:2.5 | DACH.HCl.F+A | 98 | 3.0 | 0.2 | 35.43 | 20 ppm Kaolin | 2.0 |
| A:DACH:F | 1:2.5:3 | DACH.HCl.F+A | 98 | 4.5 | 0.2 | 15.2 | 20 ppm Kaolin | 1 |
| A:DACH:F | 1:3:3 | DACH.HCl.F+A | 98 | 2.5 | 0.2 | 20.8 | 20 ppm Kaolin | poor |
| A:DACH:F | 1:3:4 | DACH.HCl.F+A | 98 | 4.5 | 0.2 | 15.96 | 20 ppm Kaolin | poor |
| A:DACH:F | 1:3:4 | A.HCl+F+DACH | 102 | 6.0 | 0.2 | 25.0 | 20 ppm Kaolin | poor |
| A:DACH:F | 1:3:4 | A.HCl+F+DACH | 102 | 6.0 | 0.2 | 24.65 | 20 ppm Kaolin | poor |
| A:DACH:F | 1.5:1:1.66 | A.DACH.HCl+F | 98 | 3.0 | 0.5 | 18.85 | 20 ppm Kaolin | 1.1 |
| A:DACH:F | 1.5:1:2 | A.DACH.HCl+F | 98 | 3.5 | 0.5 | 18.63 | | |
| A:DACH:F | 1.5:1:2 | A.DACH.HCl+F | 98 | 5.0 | 0.5 | 12.0 | 20 ppm Kaolin | 1.1 |
| A:DACH:F | 2:1:2 | A.DACH.HCl+F | 98 | 2.5 | 0.5 | 20.0 | 20 ppm Kaolin | 1.5 |
| A:DACH:F | 2:1:2.5 | A.DACH.HCl+F | 98 | 2.5 | 0.5 | 15.0 | 20 ppm Kaolin | 1.0 |
| A:DACH:F | 2:1:3 | A.DACH.HCl+F | 98 | 5.0 | 0.5 | 20.0 | | — |
| A-HMDA-F | 1:0.5:1.5 | A.HMDA.HCl+F | 35 | — | 0.5 | 16.9 | | — |
| A-HMDA-F | 1:1:1 | AF.HCl+HMDA.HCl | 40 | — | 0.5 | 20.0 | | — |
| A-HMDA-F | 1:1:2 | A.HMDA.F.HCl+F | 100 | 1.0 | 0.5 | 16.3 | | — |
| A-HMDA-F | 1:1:2.5 | A+HMDA+HCl+F | 100 | 0.5 | 0.5 | 22.5 | | — |
| A-HMDA-F | 2:1:2 | HMDA.F.HCl+A | 100 | 2.5 | 0 | 18.76 | | — |
| A-HMDA-F | 2:1:2 | HMDA.F.HCl+A | 100 | 3.0 | 0 | 21.2 | 20 ppm Kaolin | 1.2 |
| A-HMDA-F | 2:1:2.4 | HMDA.F.HCl+A | 100 | 6.0 | 0 | 17.34 | 20 ppm Kaolin | 1.0 |
| A-HMDA-F | 2:1:2.4 | HMDA.F.HCl+A+F | 100 | 5.0 | 0 | 18.0 | 20 ppm Kaolin | — |
| A-HMDA-F | 2:1:2.4 | HMDA.F.HCl+A+F | 100 | 5.0 | 0 | 18.0 | 20 ppm Kaolin | — |
| | | | | | | 12.0 | 20 ppm Kaolin | 1.3 |
| A-HMDA-F | 2:1:3 | A+HMDA+HCl+F | 100 | 4.0 | 0 | 10.0 | 20 ppm Kaolin | — |

TABLE I-continued

SYNTHESIS AND ACTIVITY OF TERPOLYMERS OF ANILINE, FORMALDEHYDE AND AMINES

| Polymer Composition | | Reaction Conditions | | | | | Water Clarification | |
|---|---|---|---|---|---|---|---|---|
| Type | Mole Ratio | Reaction Mode | T°C. | hrs | pH | % Solids | Water Type and/or Source | $r/r_o$ Actives Basis |
| A-HMI-F | 1:2:2 | A+HMI+HCl+F | 100 | 3.0 | 0 | 25.0 | 20 ppm Kaolin | 1.0 |
| A-HMI-F | 1:2:2.5 | A+HMI+HCl+F | 100 | 5.5 | 0 | 24.71 | 20 ppm Kaolin | 0.9 |
| A-HMI-F | 1:4:4 | A+HMI+HCl+F | 100 | 3.0 | 0 | 25.0 | 20 ppm Kaolin | 0.9 |
| A-HMI-F | 1:4:5 | A+HMI+HCl+F | 100 | 5.0 | 0 | 24.6 | 20 ppm Kaolin | 0.7 |
| A-ED-F | 1:1:2 | E.F.HCl+A | 100 | 2.0 | 0 | 20.0 | 20 ppm Kaolin | 1.0 |
| A-ED-F | 1:1:2.5 | ED.F.HCl+A | 100 | 4.0 | 0 | 19.78 | 20 ppm Kaolin | 0.8 |
| A-TEPA-F | 5:1:10 | TEPA.F.HCl+A | 95 | 3.0 | 0 | 20.0 | 20 ppm Kaolin | 1.0 |
| A-TEPA-F | 5:1:12.5 | TEPA.F.HCl+A | 95 | 4.0 | 0 | 19.75 | 20 ppm Kaolin | 0.6 |
| A-DEA-F | 2:1:2.5 | A+DEA+HCl+F | 95 | 3.0 | 0 | 15.0 | 20 ppm Kaolin | 1.0 |
| A-M-F | 6:1:8 | MF+A+HCl | 95 | 5.0 | 0 | 12.59 | 20 ppm Kaolin | 1.0 |
| A-M-F | 1:1:2 | MF+A+HCl | 60 | 5.0 | 0 | 9.6 | | — |
| A-M-F | 1:2:2 | MF+A+HCl | | | 0 | 6.5 | | — |
| A-Ar.C-F | 4:1:5.5 | A+Ar.C+HCl+F | 100 | 2.5 | 0 | 10.0 | 20 ppm Kaolin | 0.75 |
| A-Ar.T-F | 8:1:9.5 | A+Ar.T+HCl+F | 100 | 4.0 | 0 | 13.68 | 20 ppm Kaolin | 1.0 |
| A-Duo.C-F | 8:1:9.5 | A+Duo.C+HCl+F | 100 | 2.0 | 0 | 15.0 | | 1.2 |
| A-N,N.DMA-F | 1:1:2.5 | A+N,N-DMA+HCl+F | 96 | 6.0 | 0 | 25.0 | 20 ppm Kaolin | 0.56 |
| A-N,N.DMA-F | 1:2:3.75 | A+N,N-DMA+HCl+F | 96 | 6.0 | 0 | 25.0 | 20 ppm Kaolin | 1.2 |

Where HMI = hexamethylene imine and ED = ethylene diamine

In Table I, it should be noticed that activity is reported in $r/r_o$ which is the replacement ratio showing the superiority or inferiority of the tested polymer against a standard. The best polymers of this invention show replacement ratios of 0.3–0.9.

Further, an important requirement of the polymers in actual reducing turbidity is that it forms fine flocculating particles at a pH of about 7.0.

We claim:

1. A method of reducing the turbidity in low turbidity waters containing less than 1000 ppm of suspended solids which comprises adding thereto an effective amount of a flocculant consisting essentially of a water-soluble polymer prepared by reacting, under acid conditions, aniline or an alkyl substituted aniline, formaldehyde, and a polyamine selected from the group consisting of ethylene polyamines, polyalkylene polyamines, and cycloaliphatic polyamines, said water-soluble polymer having a molar ratio of aniline or alkyl substituted aniline to formaldehyde to polyamine of at least 1:2:1 to flocculate said suspended solids, and separating the flocculated solids from the water.

2. The method of claim 1 wherein the polyamine used to prepare the water-soluble polymer is from the group consisting of ethylene-diamine, diethylene triamine, triethylene tetramine, tetraethylene-pentamine, 1,2 diaminocyclohexane, and polyethylene polyamines resulting from the reaction of ethylene dichloride and ammonia.

3. The method of claim 1 where the polyamine is tetraethylene pentamine.

4. The method of claim 1 where the polyamine is 1,2 diamino-cyclohexane.

5. The method of claim 1 where the polyamine is a polyethylene polyamine resulting from the reaction of ethylene dichloride and ammonia.

6. The method of claim 1 wherein the polyamine is ethylene diamine.

7. The method of claim 1 wherein the polyamine is hexamethyleneimine.

* * * * *